Feb. 27, 1934.　　　　E. J. DE RIGHT　　　　1,948,845
CABLE CLAMP
Filed Sept. 24, 1932　　　2 Sheets-Sheet 1
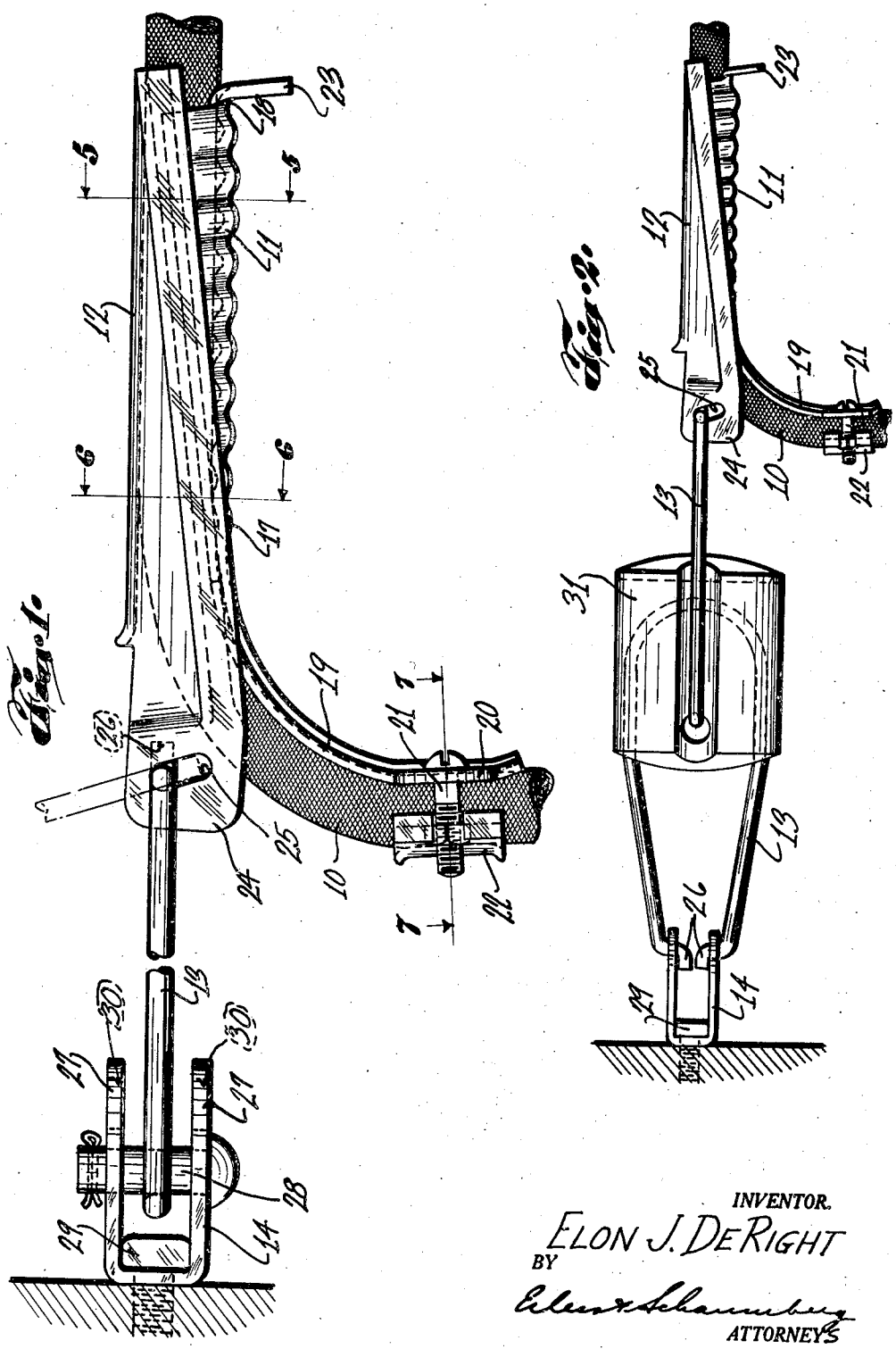
INVENTOR.
Elon J. De Right
BY
ATTORNEYS Feb. 27, 1934.  E. J. DE RIGHT  1,948,845
CABLE CLAMP
Filed Sept. 24, 1932  2 Sheets-Sheet 2
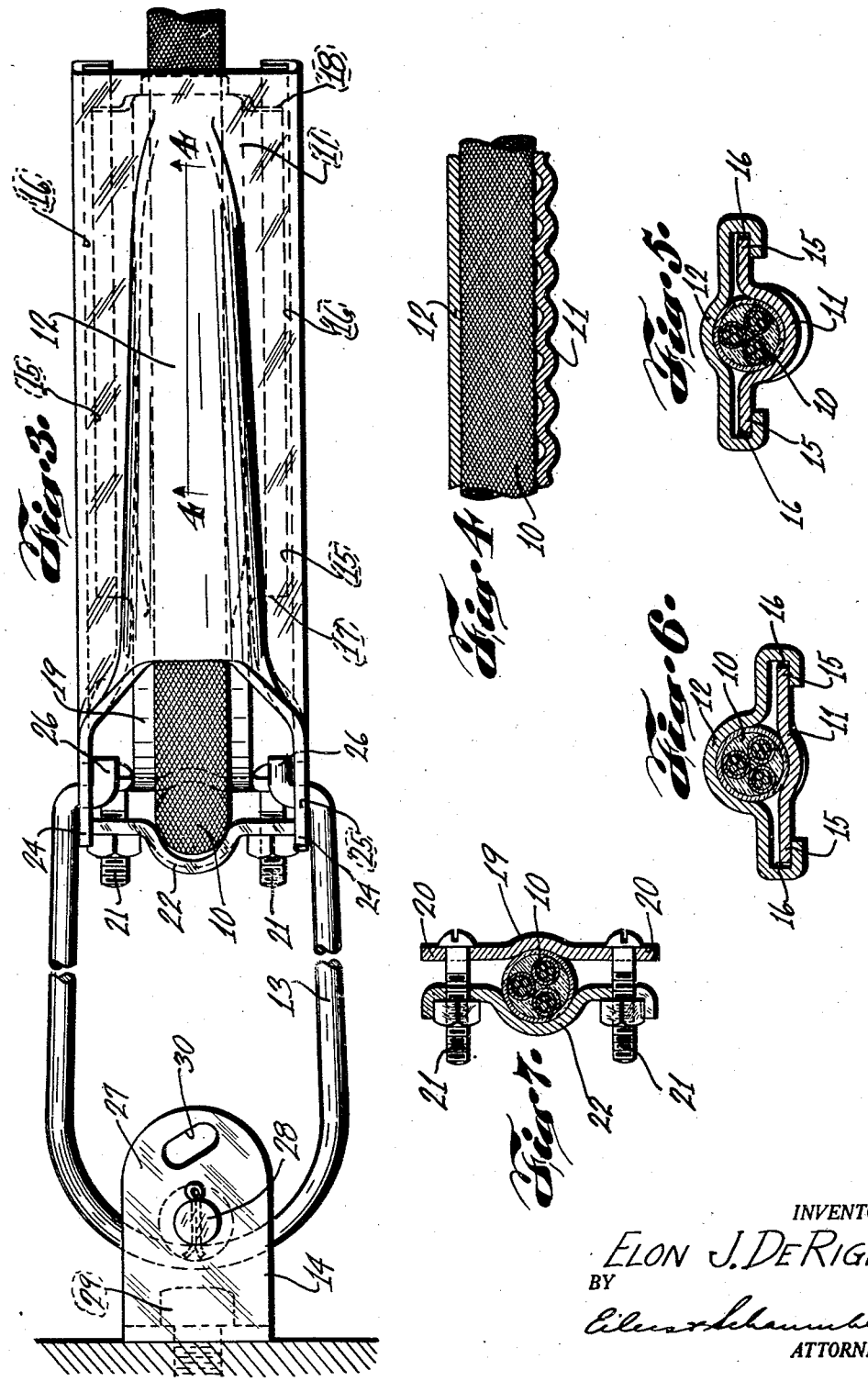
INVENTOR.
ELON J. DE RIGHT
BY
ATTORNEYS Patented Feb. 27, 1934

1,948,845

UNITED STATES PATENT OFFICE 1,948,845

CABLE CLAMP

Elon Jay De Right, Kansas City, Mo.

Application September 24, 1932
Serial No. 634,697

4 Claims. (Cl. 24—126)

This invention relates to improvements in cable clamps, and more particularly to cable clamps of a type employing coacting cable-wedging elements so arranged that the clamping action is maintained and augmented, responsively to the tension of the cable clamped by the device.

There has been a demand for a device which would permanently support, as for purposes of dead-ending, an insulated cable, having, for example, a weatherproofed braid sheath covering. The gripping effect of such a clamping device should be commensurate with the strength of the cable, and yet serve its intended purpose without damaging the protective insulation surrounding the one or more conductors within the sheath. Many of the clamps now available to the trade are unsatisfactory in failing fully to meet these requirements. Some of the strain clamps heretofore offered the trade, provide a cable gripping surface or surfaces consisting of sharp teeth, which cut into the insulation and damage it, while others provide for gripping the cable by clamping the insulation only over very restricted areas, thus subjecting localized portions of the insulation to high unit pressure and cutting effects, often with the result that the protective covering or sheath is cracked or torn where engaged by the clamp. Another disadvantage attendant certain other types of clamps, is that the cable is not permanently gripped or secured, and therefore tends to work loose and slide in the clamp as a result of vibration, windage and kindred causes. These difficulties, heretofore prevalent, are objectively eliminated in the types of clamp resulting from the present invention.

A further general object of the present invention, is to provide a metal, wedge type cable clamp, which will securely grip and hold a cable or other conductor, even when the cable is abnormally tensioned or loaded, as occasioned by a coating of ice or sleet, without causing damage to the insulation of the cable or wire, or to the clamp.

Another object of this invention is to provide a cable clamp employing an improved wedging action between coacting clamping members, such as to insure a positive grip on the cable or wire, thus eliminating the possibility of any relative endwise movement of the cable or wire with respect to the clamp.

A still further object of this invention is attained in the provision of a cable clamp which may be attached to a cable, either near one end, or intermediate the ends, without necessitating the threading of the end of the cable or wire through the clamp.

Yet another object of this invention is to provide a cable clamp having a fastening portion adaptable to be attached to a wall, pole, hook, eye, insulator, bolt, or other pole line apparatus, in order to enable this clamp to be used either at the drop end of the wire or cable, as for dead-ending purposes; and which may be used for corner constructions, or at any point along the wire or cable.

Additional objects and advantages of the present invention will appear from the following detailed description of a presently preferred embodiment thereof, considered in connection with the accompanying drawings, in which:

Fig. 1 illustrates the device of my invention in side elevation; Fig. 2, also a side elevational view, shows the device of Fig. 1 as provided with means for insulating the clamp body from the structure by which it is supported; Fig. 3 is a top plan view of the device of Fig. 1; Fig. 4 is a fragmentary sectional view, the section being taken at a plane indicated by the line 4—4 of Fig. 3, and Figs. 5, 6 and 7 are sectional views taken transversely through the clamping body and at locations indicated by the lines 5—5, 6—6, and 7—7, respectively, of Fig. 1.

Referring now by numerals of reference to the drawings, 10 indicates, by way of exemplifying a conductor to be positioned, a heavily insulated cable or wire having a braided weatherproof sheath or covering. Numeral 11 indicates, generally, the lower or wedge section of the clamp, and 12 shows the upper or housing section, which is adapted to be supported from a wall, pole or other structure by means of a bail 13 and clevis member 14. The two sections 11 and 12 are provided with complementary channels which coact to form a longitudinal conduit or passageway through the clamp body. The body sections 11 and 12 are arranged for mutual sliding engagement, opposite sides of the wedge section 11 being provided with longitudinally extending flanges 15 (Figs. 5 and 6), which are adapted to be received in correspondingly positioned elongate grooves, or flange seats 16, on the housing section 12. The cable receiving channel formed in the member 11 is of tapering depth, the depth thereof increasing gradually from the inner end, designated 17, of the clamp, to the outer end thereof, designated 18 (Fig. 1). The section 11 of the clamp body terminates at its inner end 17 in a curved depending leg 19, which is also slightly depressed laterally for the purpose of conforming to the round insulation of the cable or wire. The depressed portion of the leg 19 forms a continuation of the conduit or passageway formed by the mating body members 11 and 12. The provision of the downwardly extending curved leg 19 insures a uniform, gradual degree of curvature of the cable, when the clamp is used as a drop wire tie, or for dead-ending or corner constructions, and prevents an excessively sharp bend in the cable, which might crack, kink, or otherwise impair the metal, or the insulating cover.

The aforementioned channel, (formed in member 11), is provided with relatively large, well rounded transverse corrugations, which aid in effectively gripping the cable or its cover when the sections 11 and 12 are assembled thereon. The lower end of the curved neck 19 is provided with a pair of laterally projecting ear portions 20, which are apertured to receive bolts 21 for securing a cable-gripping clamp strap 22. When the cable is bent to conform to the wire seat on the curved leg 19, the clamp member 22 is utilized to fixedly and positively secure the cable to the section 11. Formed integrally with, and at an angle to the outer end 18 of the member 11, is a pulling ear 23 which may be used in assembling the clamp to the cable.

As previously mentioned, the section 12 is formed with an inverted channel, corresponding to the channel of section 11, but preferably without the corrugations provided in that section. The channel of section 12 is of maximum depth at the inner, or secured end thereof, and diminishes in depth toward the outer end of section 12, that end being substantially flat. The housing section 12 terminates inwardly in a pair of spaced, parallel ears 24, which are apertured as indicated by the slots 25 (Fig. 1). The free ends of the bail member 13 are bent in such a manner as to form inwardly extending lugs 26 (Fig. 3), which, when inserted into slots 25, serve detachably to connect the housing portion 12 to the bail member 13. When the cable clamp is in use, the tension of the cable or line 10 tends to draw the housing section 12 and bail 13 in alignment, in which position the lugs 24 are unable to slip out of, or be removed from the slots 25, due to the fact that the slots are formed at a distinct angle to the normal plane of the bail and clamp. The bail 13 can only be disconnected from the housing member 12, when the lugs 26 are in register with the slots 25, under which condition the legs of the bail may be easily spread so as to be brought outwardly through their respective slots. For purposes of securing the clamp to a wall, pole or other supporting structure, the bail 13 is provided with a detachable clevis member 14 hereinbefore mentioned. The clevis 14 may be formed of a single piece of flat metal, bent in such manner as to provide a pair of parallel leg members 27, which are provided with openings, for the reception of a shackle bolt 28. The base of the clevis 14 is apertured to accommodate a screw 29 for securing the clevis to a pole, wall or other supporting structure. Slots 30 are cut in the free ends of the clevis legs 27, for the purpose of enabling the bail lugs 26 to be attached to the clevis, when such connection is desired, as according to Fig. 2, in which an insulator 31 is shown disposed between, and serves to connect the paired bail members in insulated relation.

The foregoing description of the various parts will have suggested the manner of use and application of the device in its preferred embodiment; for completeness, however, these points may be reviewed as follows:

Assuming that the clevis member 14 has been secured as by means of the bolt 29 to a wall or pole, the upper and lower body portions 12 and 11 of the clamp body are relatively disassembled, as by sliding the member 11 inwardly with respect to its companion member 12. A portion of the cable may then be positioned in the groove or channel formed in the upper body portion 12, and held therein until the members are reassembled, which is accomplished by guiding the forward or outer ends of the lateral flanges 15 into the flange seats or grooves 16, at the inner end thereof. The complementary channel in the upper and lower body members 12 and 11 form a conduit for the cable, the cross-sectional area of the conduit being variable and dependent upon the relative endwise disposition of the members 12 and 11. Now, with the members 12 and 11 disposed in relatively staggered relation to render the conduit of such area that the cable will slide easily therethrough, the cable is pulled through the conduit until the desired tension is obtained. The lower body member 11 is then drawn forwardly relative to the member 12, which reduces the sectional area of the conduit and causes the channeled portions of the members to embrace and secure the cable therebetween. The corrugations provided transversely of the channels of section 11, aid in gripping the cable cover and substantially prevent any slippage of the cable through the clamp.

When in service, the drop end of the cable is extended rearwardly of the clamp body, down over the depending curved leg 19 in such manner that the insulation rests in the shallow channel provided thereon. The clamp strap 22 being positioned over the cable and secured to the leg 19 by the bolts 21, the leg 19 serves to shape the cable in a gradual curve, effectively preventing any sharp bend or kink which might otherwise result in damage to the insulation or sheath.

By use of the device herein described, the clamping pressure acting on the cable is distributed over a substantial area thereof, this provision preventing any cutting effect or other superficial damage to the cable. It will appear that the clamping body is constructed so as to utilize the tensional force in a suspended cable to maintain a constant gripping force thereon. Any increase in cable tension in a direction away from the supporting structure will tend to cause the clamp more firmly to grip the cable.

While I have described my invention with reference to a presently preferred embodiment thereof, I am aware of the fact that certain changes may be made in the device herein shown and described without departing from the spirit and full intended scope of my invention as defined by the appended claims.

I claim:

1. A strain clamp for cables including paired trough-shaped elements, slidably connected to each other, and formed for wedgingly engaging a cable therebetween, a strain anchorage connection at one end of one element, and a laterally projecting curved leg at the adjacent end of the other element, adapted to be engaged throughout its length by a bent portion of the cable, and means at the outer extremity of said leg for securing the cable thereto.

2. In a cable clamp, a body portion having a longitudinally disposed, cable-receiving channel of tapering depth, and having a pair of elongate flanges extending laterally therefrom, a support portion having a cable-receiving channel of tapering depth, and a pair of elongate, laterally extending flange-receiving grooves, a strain anchorage at one end of the support portion, for attachment of the clamp to a support, and a bail member detachably connected to said anchorage.

3. A dead-ending or strain clamp for a cable, including a channeled cable-receiving base, means slidably engaging the base for securing a cable thereto, a strain anchorage at one end of the said securing means, a rigid leg projecting from one side of the base, and forming a continuation of the channel therein, said leg being curved on a substantial radius, for cable-shaping purposes, and a cable clamp near the free end of said leg.

4. A cable clamp comprising paired, laterally adjacent clamping members, having formed on adjacent inner surfaces, complementary longitudinally disposed cable receiving grooves of tapering depth, said members being related so that the deeper end of one groove lies adjacent the shallow end of the opposite groove; means forming a tongue on each side of one of said members and a groove on each side of the other member, said means adapting the members for endwise sliding movement, one with respect to the other; one of said members terminating in a pair of slotted furcations, the slots being disposed at an angle to the longitudinal axis of the clamping assembly, and means for anchoring the assembly, said means including a bail having angulate terminal portions extending through the slots in said furcations.

ELON JAY DE RIGHT.